May 14, 1929.  V. E. FLANAGAN  1,712,817
VIBRATING MECHANISM
Filed Feb. 12, 1926  2 Sheets-Sheet 1
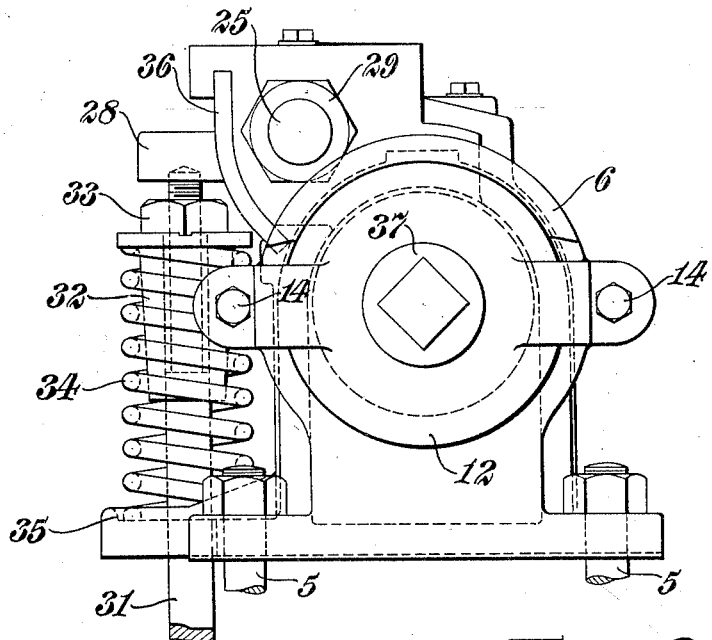

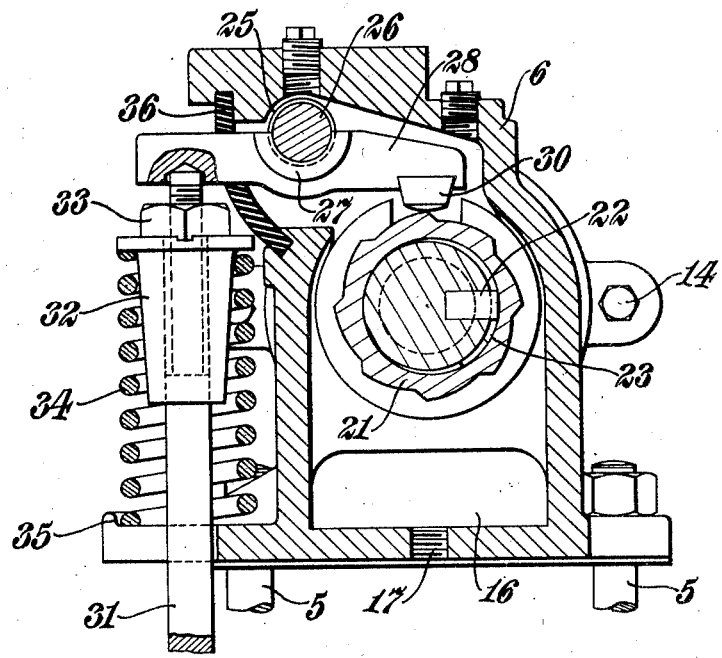
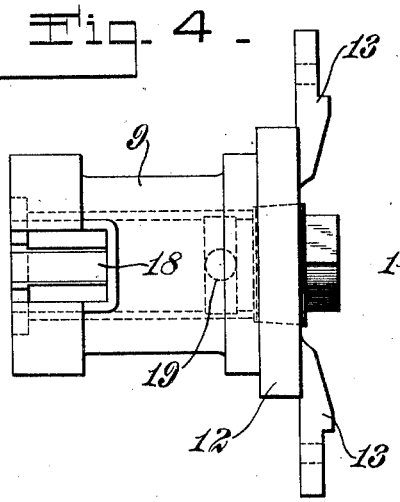
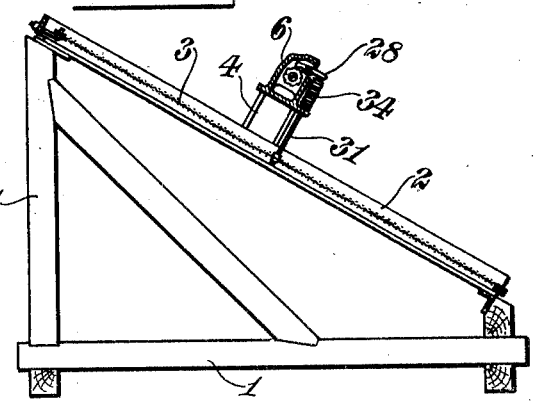

Patented May 14, 1929.

1,712,817

UNITED STATES PATENT OFFICE.

VICTOR E. FLANAGAN, OF FORT WAYNE, INDIANA, ASSIGNOR TO RICHARD A. LEAHY, OF LEADVILLE, MISSOURI.

VIBRATING MECHANISM.

Application filed February 12, 1926. Serial No. 87,834.

This invention pertains to vibrating mechanisms such as may be used for vibrating a screen in screening operations on coal, ore and the like.

One of the objects of this invention is to provide vibrating mechanism which may be easily disassembled for repairs and inspection.

Another object is to provide vibrating mechanism of substantial and rugged construction which will be reliable in service and capable of its standing hard usage.

Further objects will appear from the following description taken in connection with the accompanying drawing in which:

Figure 1 is an end view of vibrating mechanism embodying this invention;

Figure 2 is a vertical longitudinal section of the same;

Figure 3 is a central transverse section of the same;

Figure 4 is a side elevation of one of the bearing sleeves; and

Figure 5 is an illustration of screening mechanism to which the vibrating mechanism of this invention may be applied.

The vibrating mechanism of this invention is designed for use in connection with a screening device such as is shown in Figure 5 in which 1 designates a base or support which carries a frame 2 mounted at an angle thereon and supporting a screening medium 3. Spanning the frame 2 at an intermediate portion thereof is a bridge 4.

Mounted on the bridge 4 by means of bolts 5 or other suitable fastenings is a housing 6 adapted to house and support the driving mechanism. The housing 6 is formed with a bore 7 extending lengthwise thereof and traversing a pair of bridges 8 extending transversely across the housing near the bottom thereof.

Removably fitting the bore 7 at each end of the housing 6 is a sleeve 9 lined on its interior with babbitt 10 or other suitable bearing material and providing a bearing for a drive shaft 11. The sleeves 9 are formed with cylindrical portions fitting the bore 7 and each is provided with an enlarged head or flange 12 fitting a counter bore in the end of the housing 6 as shown in Figure 2. Each sleeve is further provided with a pair of ears 13 adapted to receive a pair of clamping bolts 14 for securing the sleeves in position in the housing, bolts 14 being threaded into corresponding ears on the housing. The sleeves 9 are thus securely clamped in place, gaskets 15 being interposed between the flanges 12 of the bearing sleeves and their seats in the housing so as to render these joints tight against the escape of oil from the housing. A plug 37 may be provided to close the end of the sleeve opposite to the pulley end of the shaft. The housing 6 is provided with a chamber 16 in the bottom thereof adapted to provide an oil reservoir. A threaded opening 17 in the bottom provides for the attachment of a drain pipe or drain plug not shown. The sleeves 9 and also their linings 10 may be provided with openings 18 in the upper portion thereof to catch the splash of oil and deliver the same to the bearing. Drain openings 19 may also be provided to return the used oil to the reservoir.

The shaft 11 which is adapted to run in the bearings 10, is provided near the middle thereof with an enlarged portion 20 on which is mounted a vibrator cam 21. The cam 21 may be secured against rotation on the shaft by a pin 22 engaging an eccentric bore 23 in the cam. The enlarged portion 20 runs between the two bearing members and serves to center the shaft so as to aline the cam 21. The shaft 11 may be arranged to project from one end of the housing to be equipped with a driving pulley 24 or other suitable means of connection to a source of power.

The bore 7 which provides a seat for the sleeve 9 is made large enough so that the cam 21 may pass endwise therethrough so that the shaft with the cam assembled thereon may be removed from the housing endwise through the bore 7.

Mounted in the upper part of the housing 6 is a pivot pin 25 provided with a reduced portion 26 at its middle part adapted to receive the hollow bearing 27 of a vibrating lever 28. The lever 28 fits the reduced portion 26 of the pivot pin so as to be confined between shoulders thereon, and the pin 25 is provided with adjusting nuts 29 at both ends thereof by means of which the pin may be shifted so as to adjust the lever 28 to proper alinement with the cam 21.

One end of the lever 28 may be equipped with a follower 30 adapted to engage the cam 21 to be vibrated thereby. The other end of this lever is provided with a socket adapted to receive the upper end of a stem 31 whose lower end is connected in any suitable manner with the screening medium 3. The upper end of the stem 31 is provided with a head 32 adjustable along the stem by means of a nut 33 and engaged by a spring 34 which rests in a socket 35 on the housing 6. The spring 34 serves to tension the stem 31 and to maintain the follower 30 in engagement with the cam 21. The tension of this spring may be adjusted by means of the nut 33 to any suitable value to give the required vibration. A closure 36 of a flexible sheet of rubber is provided to close the housing 6 against the entrance of dust and dirt. The lever 28 may be arranged to project through the closure 36 which, being flexible, will permit vibration of the lever.

In the operation of this device the same may be driven by a belt from a suitable source of power, not shown, engaging the pulley 24, or by other suitable driving means. Rotation of the shaft 11 drives the cam 21 so as to set the follower 30 and the lever 28 into vibration, the lever rocks about the pivot pin 25. This lever in turn sets the stem 31 into vibration so as to vibrate the screen 3. The cam rotating in the oil in the reservoir 16 provides splash lubrication for the internal working parts. The oil splashes up into the openings 18 from which it is fed to the bearings, the used oil draining back through the openings 19.

The construction is such that when repairs are required it is only necessary to remove one of the sleeves 9 whereby the shaft 11 may be removed endwise from the housing with the sleeve, the cam 21 passing through the bore 7. By this construction, therefore, it is not necessary to remove the cam from the shaft before the same may be removed from the housing, both the cam and shaft assembled may be removed together. It is of course, much more convenient to remove the cam from the shaft after the same has been removed from the housing. Also rebabbitting of the bearings may be easily accomplished by simply removing the sleeves 9, the housing 6 remaining in place on the bridge 4.

It is obvious that various changes may be made in the details of construction without departing from the spirit of this invention; it is to be understood, therefore, that this invention is not to be limited to the specific details shown and described.

Having thus described the invention what is claimed is:

1. In a vibrating mechanism of the character described, a shaft, a driving element assembled thereon, a housing for said element, a support for said shaft having an extended seat in said housing adapted upon removal of said support to permit removal of said assembled shaft and element by passage through said seat.

2. In a machine of the character described, a shaft, a driving element assembled thereon, a housing for said element, a support for said shaft having an extended seat adapted to position the same for alining said element and having an extended seat in said housing adapted upon removal of said support to permit removal of said assembled shaft and element by passage through said seat.

3. Vibrating mechanism, comprising, a shaft, a vibrator cam assembled thereon, a housing for said cam, and a support for mounting said shaft having an extended seat in said housing adapted for removal to permit removal of said assembled shaft and cam from said housing.

4. Vibrating mechanism, comprising, a shaft, a vibrator cam assembled thereon, a housing for said cam, and a support for mounting said shaft having an extended seat in said housing adapted upon removal of said support to permit removal of said assembled shaft and cam by passage through said seat.

5. In a vibrating mechanism of the character described, a shaft, a driving element assembled thereon, a housing for said element, a sleeve adapted to receive and support said shaft and fitting an extended bore in said housing, constructed and arranged to permit removal of said assembled shaft and element through said bore upon removal of said sleeve.

6. In a machine of the character described, a driving shaft, a vibrator cam thereon, a pivoted lever having a follower engaging said cam and driven thereby to rock said lever, means for adjusting the alinement of said lever with respect to said cam, a vibrating medium, and connections from said lever to said medium.

7. In a machine of the character described, a driving shaft, a vibrator cam thereon, a pivoted lever having a follower engaging said cam and driven thereby to rock said lever, means including a shiftable pivot for centering said lever, a vibrating medium, and connections from said lever to said medium.

8. Vibrating mechanism, comprising, a shaft, a vibrator cam assembled thereon, a housing therefor, an extended support for said shaft seated in said housing at a plurality of points therealong and adapted for removal from said seat, whereby said assembled shaft and cam may be removed from said housing through said seat.

In testimony whereof I affix my signature this 28th day of July, 1925.

VICTOR E. FLANAGAN.

CERTIFICATE OF CORRECTION.

Patent No. 1,712,817. Granted May 14, 1929, to

VICTOR E. FLANAGAN.

It is hereby certified that error appears in the printed specification of the above numbered patent requiring correction as follows: Page 2, lines 70 and 71, claim 2, strike out the words "having an extended seat"; and that the said Letters Patent should be read with this correction therein that the same may conform to the record of the case in the Patent Office.

Signed and sealed this 25th day of June, A. D. 1929.

(Seal)

M. J. Moore,
Acting Commissioner of Patents.